US007842261B2

(12) United States Patent
Van Der Wal et al.

(10) Patent No.: US 7,842,261 B2
(45) Date of Patent: Nov. 30, 2010

(54) PROCESS FOR PREPARING RESORBABLE POLYESTERS BY BULK POLYMERIZATION

(75) Inventors: Albert Van Der Wal, Sleeuwijk (NL); Arie Cornelis Mol, Papendrecht (NL)

(73) Assignee: Purac Biochem BV, Gorinchem (NL)

( * ) Notice: Subject to any disclaimer, the term of this patent is extended or adjusted under 35 U.S.C. 154(b) by 560 days.

(21) Appl. No.: 11/407,128

(22) Filed: Apr. 20, 2006

(65) Prior Publication Data

US 2006/0258834 A1 Nov. 16, 2006

(30) Foreign Application Priority Data

Apr. 21, 2005 (EP) .................................. 05103243

(51) Int. Cl.
*B01J 8/08* (2006.01)
(52) U.S. Cl. ................... 422/232; 422/129; 422/131; 422/134; 422/138; 422/141; 422/142; 422/146; 422/198; 422/292; 528/171; 528/354; 528/359; 528/419; 526/64; 526/72; 526/75; 526/88
(58) Field of Classification Search .............. 528/272, 528/355, 503, 480, 481, 271, 354, 359, 419; 422/131, 129, 138, 198, 292, 132, 134, 135, 422/141, 142, 146, 232; 424/426; 425/205; 526/64, 72, 75, 88, 89
See application file for complete search history.

(56) References Cited

U.S. PATENT DOCUMENTS

| 3,140,917 | A | 7/1964 | Klein |
| 4,539,981 | A | 9/1985 | Tunc |
| 4,550,449 | A | 11/1985 | Tunc |
| 6,723,826 | B2 * | 4/2004 | Yamaguchi et al. ...... 528/308.6 |
| 7,057,007 | B2 * | 6/2006 | Nakamoto et al. ....... 528/308.6 |
| 7,087,204 | B2 * | 8/2006 | Kawano et al. ............ 422/135 |

(Continued)

FOREIGN PATENT DOCUMENTS

NL   1 028 832 C   6/2005

(Continued)

OTHER PUBLICATIONS

J. Nieuwenhuis, "Synthesis of Polylactides, Polyglycolides and Their Copolymers," Clinical Materials, vol. 10, pp. 59-67, 1992.

(Continued)

*Primary Examiner*—Ling-Siu Choi
*Assistant Examiner*—Frances Tischler
(74) *Attorney, Agent, or Firm*—Oliff & Berridge, PLC

(57) ABSTRACT

The invention pertains to a process for preparing resorbable polyesters by bulk polymerization, wherein the reaction components are melted and homogenized in a reactor, the reaction mixture is then transferred into a polymerization reactor having a lumen defined by a reaction wall, wherein said reactor wall comprises at least two components which are releasably fitted to each other and wherein the shortest distance of any point within said lumen to the reaction wall is less than 8 cm, the reaction mixture is polymerized and the resulting polymer is removed from the polymerization reactor by releasing the components of the reactor wall exposing the resulting polymer lengthwise. The invention further relates to a polymerization reactor having a lumen defined by a reaction wall for performing said process.

21 Claims, 3 Drawing Sheets

U.S. PATENT DOCUMENTS

| | | |
|---|---|---|
| 7,256,250 B2 * | 8/2007 | Tuominen et al. .......... 528/272 |
| 2004/0167297 A1 | 8/2004 | Kommareddi et al. |
| 2004/0230026 A1 | 11/2004 | Yamane et al. |

FOREIGN PATENT DOCUMENTS

| | | |
|---|---|---|
| WO | WO 02/100532 A1 | 12/2002 |
| WO | WO 03/006526 A1 | 1/2003 |
| WO | WO 03/057756 A1 | 7/2003 |

OTHER PUBLICATIONS

J. Leenslag et al., "Synthesis of High-Molecular-Weight Poly(L-Lactide) Initiated with Tin 2-Ethylhexanoate," Makromol. Chem., vol. 188, pp. 1809-1814, 1987.

Foreign Office Action from European Patent Office, mailed Jan. 12, 2009.

International Search Report, mailed Jul. 4, 2006.

* cited by examiner

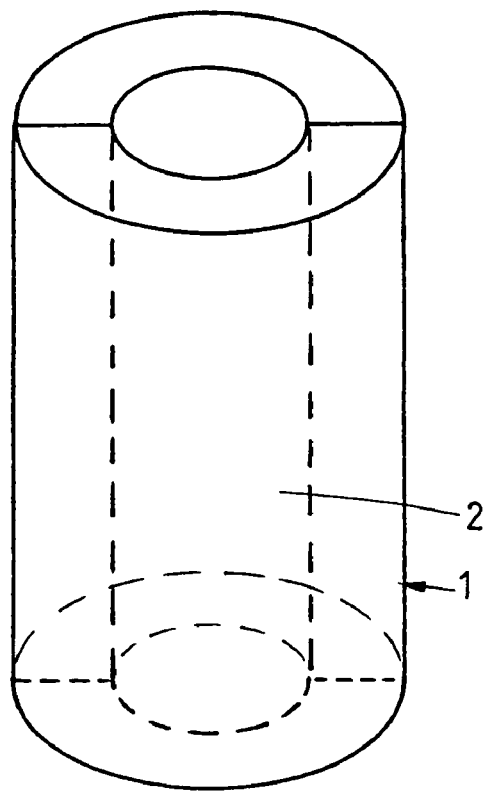
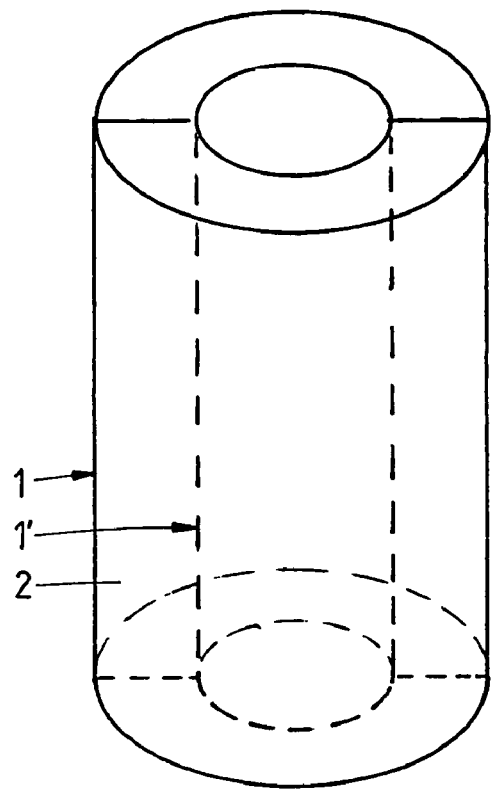
Fig.2A
Fig.3A
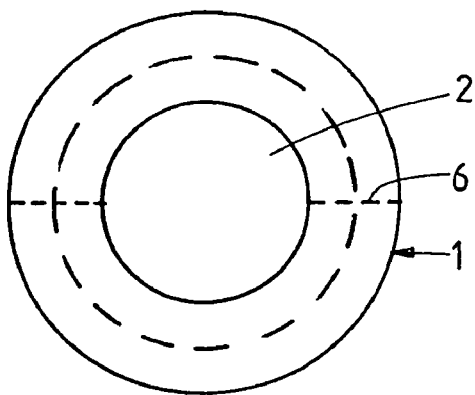
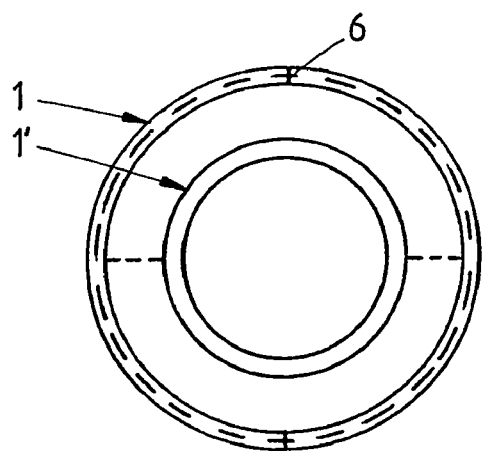
Fig.2B
Fig.3B

PROCESS FOR PREPARING RESORBABLE POLYESTERS BY BULK POLYMERIZATION

The invention relates to a process for preparing resorbable polyesters by bulk polymerization, wherein the reaction components are melted and homogenized in a stirred reactor and the reaction mixture is then transferred into a polymerization reactor to be polymerized and subsequently be removed from the polymerization reactor.

Resorbable polyesters for the purposes of the present process are aliphatic polyesters based on lactide (L-lactide, D-lactide, DL-lactide, meso-lactide) or glycolide as well as copolymers with two or more different comonomer units of the abovementioned monomers with one another and copolymers of the monomers with trimethylene carbonate (TMC) and/or epsilon-caprolactone. This group of polyesters is preferably used to prepare resorbable implants for use in human or animal bodies, such as for example for fixation elements, films, membranes, suture thread or also for pharmaceutical drug delivery systems.

Polymerization processes for preparing resorbable polyesters are known from the prior art. In addition to polycondensation processes which can only be used to produce relatively low-molecular weight polyesters, they are preferably prepared by ring-opening polymerization of the corresponding cyclic monomers, namely L-lactide, D-lactide, DL-lactide, meso-lactide, glycolide, trimethylene carbonate, epsilon-caprolactone with the addition of metal catalysts. A plurality of catalysts are known from the prior art. Preferably, tin or zinc compounds are used. According to the prior art additives which make it possible to control the molecular weight in the polymer (chain length moderators) may be added to the reaction mixture. Aliphatic alcohols such as ethanol, dodecanol, hydroxycarboxylic acids, such as glycolic or lactic acid or also oligomeric lactic acids or water have proved suitable.

A number of techniques for the ring-opening polymerization of lactides and related lactones is also known from the prior art. Fusion or melt polymerization, bulk polymerization, solution polymerization and suspension polymerization are described, for example (e.g., J. Nieuwenhuis, *Clinical Materials*, 10, 59-67, 1992). Of these, fusion and bulk polymerization are of the greatest technical importance. The difference between the two techniques is the reaction temperature. Whereas all the reaction components are in a molten state in fusion polymerization, the bulk polymerization is carried out at a temperature at which the monomers are in the molten state and the resulting polymer is in a solid state. Depending on the type of monomer/polymer the temperature during bulk polymerization may be between about 50° C. and 190° C., whereas for fusion polymerization temperatures in the range from about 190° C. to 230° C. generally have to be selected.

The advantage of bulk polymerization over fusion polymerization is the lower reaction temperature: because of the more moderate temperature side reactions occur to a considerably lesser extent. Side reactions during polymerization are detrimental on the one hand as they cause chain termination in the growth reaction and thereby limit the molecular weight in the polymer. Also the molecular weight distribution is widened as well as the residual monomer content. Resorbable polyesters with a very high molecular weight can therefore only be produced by bulk polymerization and not in a melt. The high reaction temperatures of the fusion polymerization also have the drawback that the resulting polymers may have some discoloration. These impurities produced at high temperatures are often polymer-bound and therefore cannot be removed from the product in a subsequent purification step. With respect to the preferred use of the polyesters in the human body it is advantageous to avoid contamination of every kind.

Another advantage of a low reaction temperature is the control of transesterifications during the polymerization. On the one hand transesterification reactions are slower, so in this way it is possible to prevent strong randomization of the monomer sequences during copolymerization. On the other hand by increasing the reaction time, homogeneous distribution of monomers within the polymer can be enhanced. Also because of the different reactivities of the individual monomers copolymers with a block-like sequence can be produced at low temperature.

It is known, particularly with regard to poly(L-lactide), e.g. from U.S. Pat. Nos. 4,539,981 and 4,550,449 as well as from J. Leenslag, A. Pennings, *Makromol. Chem.*, 188, 1809-1814, 1987, that by a suitable choice of the reaction conditions such as the reaction time and temperature as well as the concentration of the catalyst and the chain length moderator, the bulk polymerization can be controlled accordingly in terms of the molecular weight of the reaction product and the speed of the reaction.

Whereas fusion polymerization can readily be carried out either continuously or discontinuously on a large scale in a suitable polymerization apparatus, bulk polymerization presents major problems when performed on a large scale. As the reaction mass solidifies during the polymerization, it is not possible to carry out the reaction in stirred reactors. The reaction product takes on the shape of the inner wall of the reactor and has to be removed from the reactor as a compact block. Thus, as the reaction mixtures are scaled up, ever larger blocks of material are produced. The handling and also subsequent grinding up into workable granules therefore becomes impossible upwards to a certain order of magnitude. A further difficulty is the removal of the heat of the reaction. As these polymerization reactions are strongly exothermic, and moreover the polymer mass formed has very poor heat conductivity, in larger reactors temperature gradients may be formed which give rise to serious and unacceptable inhomogeneities in the product. These inhomogeneities may take the form of different molecular weights and, in the case of copolymers, in different molar compositions as well. According to reference (1) the temperature increase on the inside may be up to 80° C.

Whereas the literature contains sufficient information on the choice of suitable reaction parameters for bulk polymerization in a small-scale reaction, particularly for poly(L-lactides), the prior art contains no teaching as to how the reaction can be carried out on an industrial scale. The Examples in the literature are carried out on a small scale up to a maximum of a few hundred grams and are, moreover, carried out in test tubes in a laboratory.

WO 03/057756 tries to solve this problem by transferring the monomer mixture into a number of smaller plastic bottles and polymerizing the reaction mixture in said bottles. After polymerization and cooling (in the air), the bottle necks are cut of and the polymer is removed.

It goes without saying that the use of those plastic bottles, sometimes up to 90, and the subsequent removal of the polymer from said bottles is elaborate, expensive and by no means suitable for production on industrial scale.

WO 03/006526 describes a process for the preparation of resorbable polyesters by bulk polymerization. In this patent publication the problem is addressed of removing the resulting polyester from the reactor. The polyesters are obtained by polymerizing the reaction mixture in a tubular reactor. The shape of the reactor is tapered so that upon shrinkage of the resulting polymer, the polymer is released and can be removed from the reactor. Further, in the text it is described that the diameter of the tubular reactor should be 3 cm or smaller in order to prevent discoloration of the polymer. The use of tapered reactors only works when crystalline polymers are prepared: The shrinkage of amorphous polymers (i.e. copolymers with more than 50% monomers other than glycolide, D,L-polylactide, L,D,L-polylactide, etcetera) is too small to be effective. Furthermore, amorphous polymers tend to be stickier than crystalline and thus removal from the reactor proves more difficult. In addition, as is indicated on page 6 lines 23-27, this process only provides a solution for small volume production. In the examples volumes are given of 100 g, 400 g and one of 2 kg.

The problem is therefore to provide a process which can be used on an industrial scale for preparing resorbable polyesters by bulk polymerization at moderate temperatures by which high quality resorbable polyesters can be produced on a large scale.

DETAILED DESCRIPTION OF THE INVENTION

When developing the process it was found that the problems described above can be overcome by adapting the shape and construction of the polymerization reactor. By making sure that the thickness of the reaction mixture being present in said polymerization reactor is kept small, the heat created during the polymerization can be transferred to the reactor walls and no degradation of the polymer takes place. Beside that the reactor wall should comprise two or more components which can be released to remove the resulting polymer.

In this process the cyclic monomers are reacted, in a manner known per se, with the addition of metal catalysts and optionally chain length moderators to form the respective polymers at temperatures at which the monomer is present in molten form but the reaction product is solid or virtually solid.

The present invention thus relates to a process for preparing resorbable polyesters by bulk polymerization, while the reaction components are melted and homogenized in a reactor under agitation, then the reaction mixture is converted into a polymerization reactor having a lumen defined by a reactor wall, wherein said reactor wall comprises at least two components which are releasably fitted to each other and wherein the shortest distance of any point within said lumen to the reactor wall is less than 8 cm, the reaction mixture is polymerized and the resulting polymer is removed from the polymerization reactor by releasing the components of the reactor wall exposing the resulting polymer shape lengthwise.

As indicated above, owing to the fact that the lumen wherein the reaction takes place has a specific shape, the thickness of the reaction mixture remains small and all the heat created during the polymerization process can sufficiently be transferred into the reactor walls and no degradation, and therefore no inhomogeneity can occur. Preferably, the shortest distance of any point within said lumen to the reaction wall is less than 4 cm, more preferably the shortest distance is less than 3 cm.

Even though the thickness of the reaction mixture must be kept small, it will still be possible to create polymerization reactors with large volumes and thus the process according to the invention is very suitable for use on industrial scale. This is because the reactor wall of the reactor comprises at least two components which are releasably fitted together during polymerization and after cooling the components are released from each other to enable removal of the polymer. It is essential that the components be configured so that upon release the resulting polymer shape is exposed lengthwise. If this is not the case, it is still not ensured that the polymer shape can readily be removed. In the prior art, for instance, tubular reactors are described from which the resulting polymer rod is moved by removing the silicone rubber stopper and keeping the reactor upside down. It goes without saying that this type of reactors can only be used with relatively small volume productions. Said releasable fittings may comprise screw/bolt systems, hinges, flanges, covers or combinations thereof. Said components and their releasable fittings have the additional advantage that the reactor wall can easily be inspected. Furthermore, as the resulting polymer shape does not have to be removed via the reaction mixture inlet, several improvements to the reaction mixture inlet become also possible herewith, such as decreasing the inlet size and reducing the amount of inlets necessary. In contrast to reactors wherein polymers are prepared in a tapered form, polymer shapes can be prepared which can readily be processed into smaller particles such as chips or granules and optionally subsequently eliminating any unreacted monomers by extraction or by dissolution/precipitation methods.

Various shapes of the polymerization reactor can be chosen to create a lumen with the desired shape and still a large total reactor volume. In one embodiment the polymerization reactor has a rod-shaped lumen. By expanding the length of the rod shaped lumen the total reaction volume can be expanded without detrimentally affecting the heat transfer of the total system. Because the components of the reactor wall can be released after polymerization and cooling and thereby exposing the polymer rod lengthwise, the resulting polymer rod can easily be removed even if the length of the rod is relatively long.

In a preferred embodiment the polymerization reactor has at least one annular-shaped lumen. This can be obtained with a polymerization reactor which is built up from two or more cylindrical shapes fitted into each other so that an annular shaped lumen is formed between the cylindrical shapes. It goes without saying that the cylindrical shapes do not have to be perfectly cylindrical, but its cross-sections can be flattened, conical, or polygonic, etcetera, and combinations thereof. With the use of several cylindrical shapes fitted into each other enormous reactor volumes can be obtained without detrimentally affecting the heat transfer of the system. The annular shaped lumens formed when using several cylindrical shapes fitted into each other are connected so that the reaction mixture can easily be transported into the polymerization reactor by one inlet, which simplifies the handling because only one inlet must be kept inert and in fact one large polymerization reactor is created. Because the components of the reactor wall can be released after polymerization and cooling and thereby exposing the polymer shapes lengthwise, the resulting polymer shapes can easily be removed even if the reactor is composed of several cylindrical shapes.

In another preferred embodiment according to the invention the polymerization reactor has a plate-shaped lumen. This can be obtained with a polymerization reactor which is built up from two or more plate-like shapes fitted together, optionally with side plates, to form a plate-shaped lumen. It goes without saying that the plate-like shapes can have any shape such as circular, rectangular, triangular, multi-angular, etcetera. With the use of several plate-like shapes fitted together enormous reactor volumes can be obtained without detrimentally affecting the heat transfer of the system. The plate shaped lumens formed when using several plate-like shapes are connected so that the reaction mixture can easily be transported into the polymerization reactor by one inlet, which simplifies the handling because only one inlet must be kept inert and in fact one large polymerization reactor is created.

In the case of several plate-like shapes fitted together, the components which are releasably fitted preferably are the plate-like shapes which upon release expose the polymer plates lengthwise (i.e., at their largest length). For rectangular plate-like shapes this means at the surface defined by the length and width of the plate and not its thickness. For circular plate-like shapes this means the surface defined by the perimeter of the circular-shape and not the thickness of the polymer disk. Thus, enormous reactor volumes can be created without detrimentally affecting the removal of the resulting polymer shapes. The resulting polymer plates can easily be processes into smaller particles.

In order to facilitate removal of the resulting polymer shape it may be opportune to provide the lumens with compartment dividers, especially when polymerization reactors are used wherein several shapes are fitted into each other. Said compartment dividers are for instance baffles which are placed in the lumen of the reactor.

Another measure which can be taken to ensure that the resulting polymer can be removed easily from the polymerization reactor is coating the inner walls of the polymerization reactor. Preferably the inner walls of the polymerization reactor are coated with material which is chemically and thermally stable at the reaction temperatures chosen may be used for the process. Coatings made from plastics selected from among the polyolefins, polycarbonates or fluorinated and partly fluorinated plastics are preferred. Polypropylene and polytetra-fluoroethane (Teflon®) are preferred.

Because the polymerization process is conducted at increased temperature and the temperature should be controlled precisely, the walls of the polymerization reactor are preferably fitted with a heating/cooling device. Suitable heating/cooling devises are the ones comprising oil as heating/cooling medium and steam/water/glycol systems. In the prior art heating devices are mentioned which are placed on the outside of the reactor such as oil baths and jackets mounted on the outside of the reactor. As soon as industrial scale operations are desired these prior art suggestions will not do.

A preferred process comprises the following steps:
(a) melting the monomer(s) in a stirred reactor;
  (a1) adding the catalyst;
  (a2) optionally adding a chain length moderator and/or co-initiator;
  (a3) homogenizing the reaction mixture using a stirrer;
(b) transferring the reaction mixture into the polymerization reactor.
(c) carrying out the polymerization reaction in the polymerization reactor until the desired degree of reaction of the polymerization is achieved;
(d) removing the solid polymer formed from the polymerization reactor.

Further processing can be carried out using methods known per se, such as e.g. grinding into granules and subsequently by extracting and/or by dissolution/precipitation methods eliminate any unreacted monomers or by precipitation methods. As mentioned-above, the form in which the resulting polymer is prepared is as such that further processing into smaller particles such as chips, granules etcetera is easy.

Preferred monomers are those which can be polymerized by ring-opening polymerization of the corresponding cyclic monomers, for example L-lactide, D-lactide, DL-lactide, meso-lactide, glycolide, p-dioxanone, trimethylene carbonate, ethylene oxalate, lactones such as beta-propionlactone, beta-butyrolactone, pivalo-lactone, gamma-butyrolactone, delta-valerolactone, beta-methyl-delta-valerolactone, and epsilon-caprolactone, 1,3 dioxane.

Homopolyesters selected from among the polylactides and polyglycolides, particularly poly(L-lactide), poly(DL-lactide), poly-D-lactide, and poly-TMC are preferred.

Also preferred are copolyesters (including two or more types of monomers) selected from the following groups:

polylactides which may be obtained from various stereoisomeric lactides, particularly copolyesters of L-lactide and DL-lactide, copolyesters of glycolide or lactide and trimethylene carbonate, copolyesters of lactide, particularly DL-lactide or L-lactide and glycolide, copolyesters of lactide and epsilon-caprolactone.

The order of steps (a1) and (a2) may be reversed. Depending on the nature of the catalyst and chain length moderator and/or co-initiator the catalyst may also be dissolved in the chain length moderator.

Throughout the reaction, the air space above the reaction mixture is made inert by means of an inert anhydrous gas. Argon, helium and nitrogen are preferred, of which nitrogen is particularly preferred. This is why, the use of a polymerization reactor with connected multiple lumens is preferred.

The reaction mixture may be transferred from the melt container into the polymerization reactor using conventional pumps, by gravity or by applying pressure to the melt reactor using an inert gas, particularly nitrogen. To eliminate any particulate contaminants from the melt a melt filter made of plastics or stainless steel may be interposed.

The capacity of the polymerization reactor may be in the range between 1 liter and 1000 liters, preferably in the range between 5 and 500 liters, most preferably in the range between 10 and 300 liters.

The reactor for melting and homogenizing the reaction mixture may be a conventional reactor the inner wall of which consists of a material which is chemically inert to the reaction mixture, e.g. stainless steel, carbon steel, aluminum, copper, silver, gold, platinum, chromium, nickel, and zinc, or their alloys, glass, enamel, or Hastelloy. The preferred size of the reactor depends on the desired batch size and may be within the range between 1 and 1000 liters. For homogenization the reactor my be provided with an agitator such as a stirrer, but also extruders, kneaders, mixers can suitably be used in the process according to the invention.

The reactions are generally carried out at a temperature between 50° C. and 230° C., preferably between 70° C. and 170° C., particularly between 100° C. and 150° C. Sometimes optimally temperature schedules are used during the reaction. The preferred (and particularly preferred) reaction temperatures depend on the particular monomer or monomer mixture and are, for example, for:

| L-lactide: | 105 to 150° C. (110 to 130° C.) |
|---|---|
| D-lactide: | 105 to 150° C. (110 to 130° C.) |
| DL-lactide: | 125 to 170° C. (125 to 160° C.) |
| meso-lactide: | 60 to 150° C. (90 to 140° C.) |
| L/DL-lactide: | 110 to 150° C. (110 to 140° C.) |
| L-lactide/TMC: | 105 to 150° C. (105 to 120° C.) |
| L-lactide/epsilon-caprolactone: | 105 to 150° C. (105 to 140° C.) |
| DL-lactide/TMC: | 110 to 150° C. (110 to 130° C.) |
| L-lactide/glycolide: | 105 to 170° C. (105 to 150° C.) |
| DL-lactide/glycolide: | 110 to 170° C. (110 to 150° C.) |
| glycolide: | 130 to 190° C. (140 to 180° C.) |
| glycolide/TMC: | 110 to 190° C. (120 to 160° C.) |

The reactions are preferably carried out isothermically. In some cases, however, it is advantageous to start at lower temperatures in order to avoid strongly exothermic reactions, and to raise the temperature as the reaction proceeds in order to increase the speed of reaction of the monomers. This applies particularly to polymerization involving monomers of comparatively low reactivity such as trimethylene carbonate or epsilon-caprolactone. Temperature decrease during the reaction is of course also possible.

Preferred catalysts are tin or zinc compounds, while tin(II) halides such as tin(II)chloride and tin(II)alkoxides such as tin(II)octanoate or tin(II)ethylhexanoate are most particularly preferred. The additives used to regulate the chain length and/or co-initiate the reaction are compounds such as (aliphatic) alcohols, aliphatic polyols acids, hydroxycarboxylic acids and the esters thereof, water, or oligomeric lactides. Water, lactic acid, oligomeric lactic acid, ethyl lactate, buthyl lactate, ethyl hexyl lactate or dodecanol are preferred.

In the process the catalysts are preferably used in low concentrations in order, on the one hand, to minimise the development of heat during the polymerization by keeping the reaction speed low and, on the other hand, to prevent the reaction mass from polymerizing to any appreciable extent while it is still in the melt reactor, which would make the transfer into the polymerization reactor more difficult because of the rise in viscosity. However, it should be noted that some polymerization usually has taken place in the monomer reactor prior to transport to the polymerization reactor. Moreover, the use of small amounts of catalyst is advantageous with respect to the use of the polyesters in the human body. In the case of tin compounds the preferred concentrations are 1 to 100 ppm, more preferably 5 to 50 ppm (calculated in each case as tin, based on the total reaction mass).

The preferred concentration of the chain length moderator depends on the structure of the moderator and the desired molecular weight of the polymer and is between 0 and 100,000 ppm, more preferably between 0 and 10,000 ppm, particularly 50 to 9,000 ppm, based on the total reaction mass.

The reaction times required depend on the reactivity of the monomer or monomers, the temperature selected and the concentration of catalyst and the required degree of conversion. Reaction times of between 0.5 and 25 days, more preferably between 1 and 10 days, particularly 2 to 9 days, are preferred.

As a rule the desired degree of polymerization is reached when, of the monomers used, less than 10%, preferably 0 to 9%, most preferably 0.1 to 7%, particularly 0.2 to 5% are present in the polymer obtained by the process according to the invention.

The polyesters prepared by the process according to the invention generally have a inherent viscosity (Ubbelohde viscosimeter, chloroform, 0.1%, 25° C.) of between 0.2 and 12 dl/g, preferably between 0.5 and 10 dl/g, most preferably between 1.0 and 9.0 dl/g.

Suitable polymerization reactors are further described with the help of FIGS. 1A, 1B, 2A, 2B, 3A, 3B, 4 and 5.

FIG. 2A is a schematic view of a polymerization reactor with a rod-shaped lumen.

FIG. 2B is a cross-sectional view of the polymerization reactor of FIG. 2A.

FIG. 3A is a schematic view of a polymerization reactor with an annular-shaped lumen.

FIG. 3B is a cross-sectional view of the polymerization reactor of FIG. 3A.

Figure 1A:
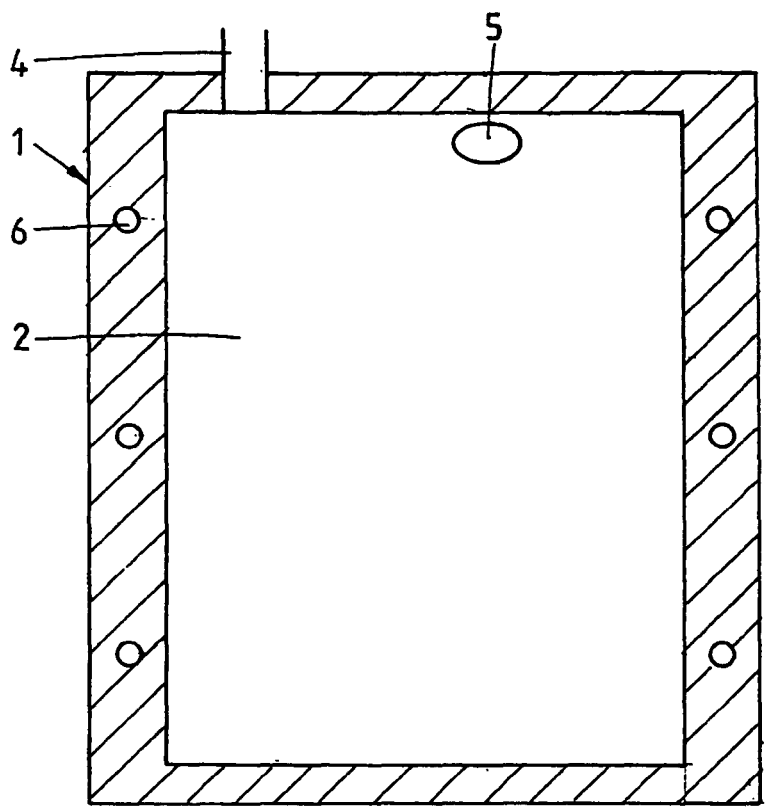
FIG. 1A is a cross-sectional view of a polymerization reactor with a plate-shaped lumen.
Figure 1B:
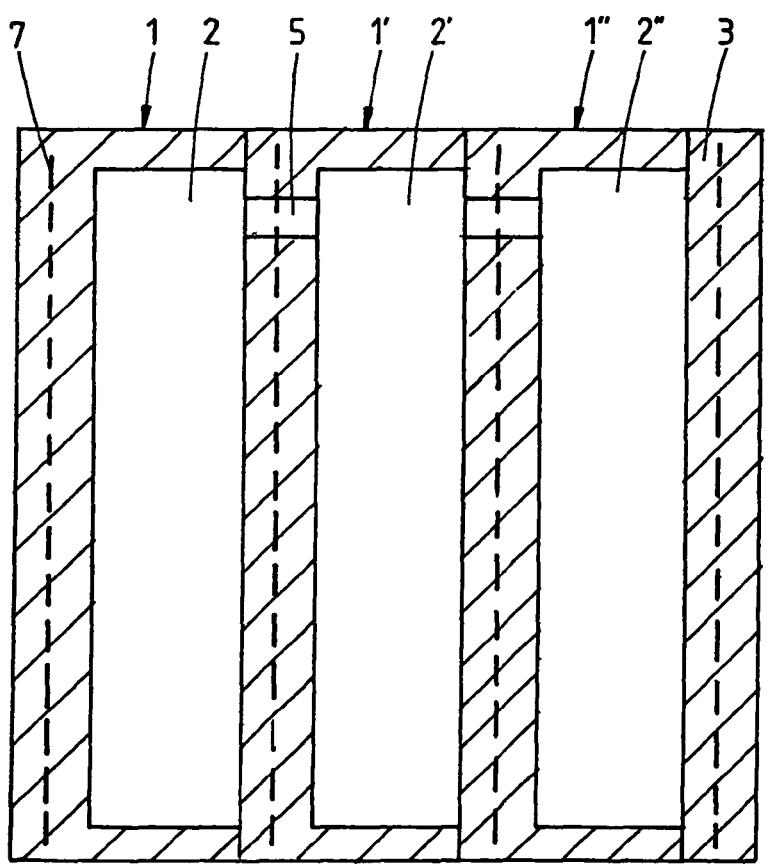
FIG. 1B is a cross-sectional view of a polymerization reactor, which is built up from three plate-like shapes fitted together with an end plate

FIG. 1A is a cross-sectional view of a polymerization reactor comprising a plate-like shape (1) and FIG. 1B is a cross-sectional view of said polymerization reactor comprising three plate-like shapes (1,1', and 1") and end-plate (3) fitted together to form plate-shaped lumens (2,2', and 2"). The plate-like shape (1) is provided with an inlet (4) for the reaction mixture, and an overflow (5) which creates the connection between the plate-shaped lumens (2,2') of the polymerization reactor. The plate-like shapes (1,1', and 1") and end-plate (3) are releasably fitted together with fittings (6). The plate-like shapes (1, 1', 1") are provided with heating/cooling means (7).

In FIG. 2A a schematic view is depicted of a polymerization reactor with an annular shape (1) creating a rod-shaped lumen (2). In FIG. 2B a cross-sectional view is given of the polymerization reactor of FIG. 2A, which is provided with fittings (6). Said annular shape (1) comprises 2 components, which are releasably fitted together.

Figure 5:
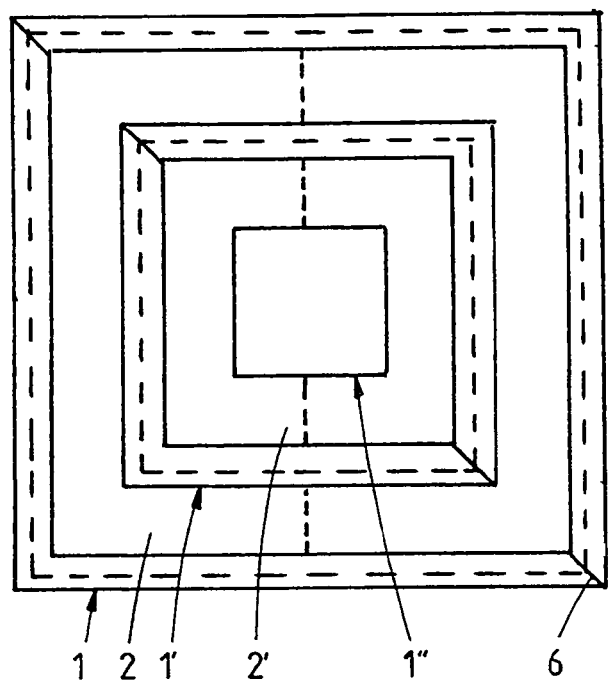
FIG. 5 is a cross-sectional view of a polymerization reactor with two annular-shaped lumens obtained by fitting a small annular shape into a larger annular shape.
Figure 4:
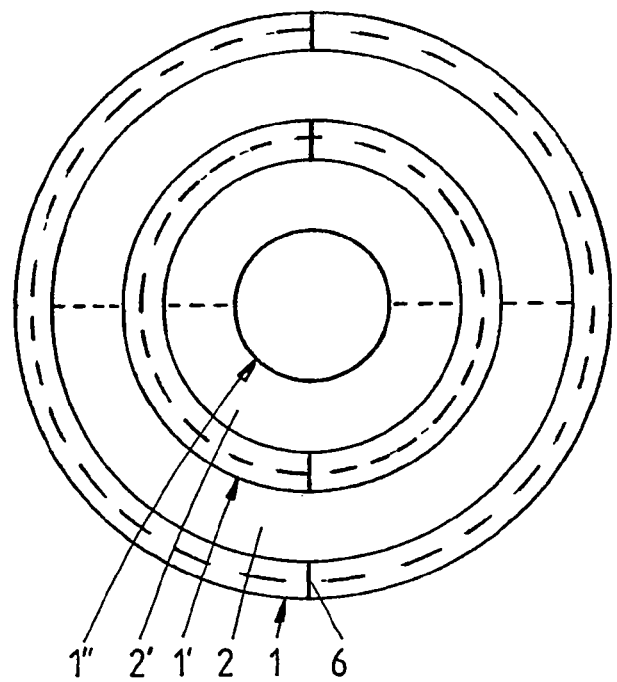
FIG. 4 is a cross-sectional view of a polymerization reactor with two annular-shaped lumens obtained by fitting a small cylindrical shape into a larger cylindrical shape.

In FIG. 3A a schematic view is depicted of a polymerization reactor with two annular shapes (1, 1') fitted into each other creating an annular-shaped lumen (2). In FIG. 3B a cross-sectional view is given of the polymerization reactor of FIG. 3A, which is provided with fittings (6). Said annular shape (1) comprises 2 components which are releasably fitted together In FIGS. 4 and 5 cross-sectional views of a polymerization reactors are given comprising three annular shapes (1,1',1") fitted into each other to create lumens (2,2'). The annular shapes are built up from two components which are releasably fitted together with fittings (6).

The following Examples serve to illustrate some processes carried out by way of example for preparing the reabsorb able polyesters. They are intended solely as possible methods described by way of example without limiting the invention to their contents.

EXAMPLE 1

A tube reactor having a rod-shaped lumen (55.5 cm long, 16 cm wide) was filled with 12.5 kg of L-lactide monomer. The reaction mixture was polymerized at a temperature of 99° C. for 96 hours (PLA 1), respectively at 105° C. and 72 hours (PLA 2). After cooling, and removal of the polymer, the properties (inherent viscosity I.V. and molecular weight Mw) of the resulting rod-shaped polymer were measured at several spots of the rod, i.e.

at 4 cm from the top: A at 28 cm from the top: B at 50 cm from the top: C spots A1, B1, and C1 were at 20 mm from the side, spots A2, B2, and C2 were at 30 mm from the side, spots A3, B3, and C3 were at 50 mm from the side.

The results are compiled in TABLE I

|       | PLA 1    |         | PLA 2    |         |
|-------|----------|---------|----------|---------|
| Spots | I.V.(dl/g) | Mw    | I.V.(dl/g) | Mw    |
| A1    | 7.45     | 463,000 | 6.63     | 394,400 |
| A2    | 7.43     | 461,300 | 6.67     | 398,000 |
| A3    | 7.29     | 449,400 | 6.67     | 398,000 |
| B1    | 7.57     | 473,200 | 6.68     | 398,000 |
| B2    | 7.68     | 482,700 | 6.74     | 403,000 |
| B3    | 7.75     | 488,600 | 6.62     | 393,500 |
| C1    | 7.36     | 455,200 | n.m.     | n.m.    |
| C2    | 7.48     | 465,300 | 6.60     | 392,200 |
| C3    | 7.66     | 481,000 | n.m.     | n.m.    | n.m. is not measured

From these data it is clear that within the polymer rod the polymer prepared is homogeneous.

EXAMPLE 2

Monomers were mixed and homogenized in a monomer reactor and transported into a polymerization reactor provided with an oil heating/cooling device comprising 7 plate-shapes and an end plate fitted together creating 7 plate-shaped lumens. The reaction mixture was polymerized and after cooling, the plate-shapes were released from each other and the resulting polymer plates were removed from the reactor. Then the properties (inherent viscosity I.V. and residual monomer content RM %) of the various resulting plate-shaped polymers was measured.

The results are compiled in TABLE II and TABLE III

TABLE II

| | I.V. (dl/g) Plate no. | | | | | | |
|---|---|---|---|---|---|---|---|
| Polymer formula | 1 | 2 | 3 | 4 | 5 | 6 | 7 |
| D,L-lactide/glycolide (m:m 53/47) | 0.98 | 1.01 | 1.00 | 0.99 | — | — | — |
| L-lactide/D-lactide (m:m 96/4) | 6.89 | 6.87 | 6.77 | 6.92 | 6.72 | 6.53 | — |
| L-lactide/glycolide (m:m 85/15) | 2.83 | 2.90 | 2.95 | 2.95 | 2.84 | 2.94 | 2.94 |
| L,L-lactide | 7.47 | 7.57 | 7.49 | 7.54 | 7.48 | 7.62 | 7.48 |

TABLE III

| | RM % Plate No. | | | | | | |
|---|---|---|---|---|---|---|---|
| Polymer formula | 1 | 2 | 3 | 4 | 5 | 6 | 7 |
| D,L-lactide/glycolide (m:m 53/47) | 1.15 | 1.10 | 1.24 | 0.97 | — | — | — |
| L-lactide/D-lactide (m:m 96/4) | 1.77 | 1.75 | 1.74 | 1.76 | 1.89 | 2.15 | — |
| L-lactide/glycolide (m:m 85/15) | 3.05 | 3.08 | 3.02 | 2.90 | 3.19 | 3.02 | 3.04 |
| L,L-lactide | 0.72 | 0.70 | 0.81 | 0.69 | 0.69 | 0.74 | 0.90 |

These results show that the polymers obtained in the various plate shaped lumens of the reactor all have the same properties.

EXAMPLE 3

In a plate-shaped reactor provided with a oil heating/cooling device poly-L,L-lactic acid (PLA) and L-lactide/glycolide copolymer (m:m 85/15, PLG 85:15) was prepared with a reaction temperature of 150° C. and reaction time of 36 hours, and 150° C. and 48 hours, respectively.

After cooling the properties (inherent viscosity I.V and molecular weight Mw) of the resulting plate-shaped polymer were measured at several spots of the plate (50×70×5 cm), i.e.

at 5 cm from the top and 5 cm from the side: A at 35 cm from the top and 25 cm from the side: B at 65 cm from the top and 5 cm from the side: C spots A1, B1, and C1 were at the surface of the plate, spots A2, B2, and C2 were at 1 cm deep, spots A3, B3, and C3 were at 2.5 cm deep.

The results are compiled in TABLE IV

TABLE IV

| | IV | |
|---|---|---|
| spots | PLA | PLG 85/15 |
| A1 | 2.09 | 2.79 |
| A2 | 2.30 | 2.91 |
| A3 | 2.28 | 2.91 |
| B1 | 2.25 | 2.95 |
| B2 | 2.24 | 3.06 |
| B3 | 2.25 | 3.08 |
| C1 | 2.22 | 3.06 |
| C2 | 2.20 | 3.15 |
| C3 | 2.25 | 3.09 |

These data show that in both polymer plates the polymer is homogeneous throughout the plate.

The invention claimed is:

1. A process for preparing resorbable polyesters by bulk polymerization, comprising:
    melting and homogenizing reaction components in a reactor to form a reaction mixture;
    transferring the reaction mixture into a polymerization reactor, the polymerization reactor comprising:
        a plurality of reactor walls including at least two fittings configured to releasably connect adjacent reactor walls of the plurality of reactor walls, and
        a plurality of connected lumens formed by the connected adjacent walls,
        wherein a shortest distance of any point within a single lumen of the plurality of connected lumens to an adjacent reactor wall is less than 8 cm;
    polymerizing the reaction mixture at a temperature between about 50° C. and 230° C. to form a resorbable polyester; and
    removing the resorbable polyester from the polymerization reactor by disconnecting the at least two fittings of the plurality of reactor walls to expose the resorbable polyester lengthwise.

2. The process according to claim 1, wherein the shortest distance of any point within a single lumen of the plurality of connected lumens to an adjacent reactor wall is less than 4 cm.

3. The process according to claim 1, wherein the shortest distance of any point within a single lumen of the plurality of connected lumens to an adjacent reactor wall is less than 3 cm.

4. The process according to claim 1, wherein the polymerization reactor has a rod-shaped lumen.

5. The process according to claim 1, wherein the polymerization reactor has at least one annular-shaped lumen.

6. The process according to claim 1, wherein the polymerization reactor has at least one plate-shaped lumen.

7. The process according to claim 1, wherein the inner walls of the polymerization reactor are coated with a polyolefin.

8. The process according to claim 1, wherein the plurality of reactor walls further comprise a heating/cooling device.

9. The process according to claim 8, wherein the heating/cooling device comprises oil.

10. The process according to claim 1, wherein the resorbable polyester has an inherent viscosity of between 0.2 and 12.

11. The process according to claim 1, wherein the resorbable polyester is a polylactide or polyglycolide.

12. The process according to claim 1, wherein the resorbable polyester is poly(L-lactide).

13. The process according to claim 1, wherein the resorbable polyester is a copolymer of various stereoisomeric lactides.

14. The process according to claim 1, wherein the resorbable polyester is a copolymer of L-lactide and D,L-lactide.

15. The process according to claim 1, wherein the resorbable polyester is poly(D,L-lactide).

16. The process according claim 1, wherein the resorbable polyester is a copolymer of glycolide and trimethylene carbonate.

17. The process according to claim 1, wherein the resorbable polyester is a copolymer of lactide and glycolide.

18. The process according to claim 1, wherein the resorbable polyester is a copolymer of D,L-lactide or L-lactide and glycolide.

19. The process according to claim 1, wherein the resorbable polyester is a copolymer of lactide and trimethylene carbonate.

20. The process according to claim 1, wherein the resorbable polyester is a copolymer of lactide and epsilon-caprolactone.

21. A polymerization reactor comprised of a plurality of reactor walls including at least two fittings configured to releasably connect adjacent reactor walls of the plurality of reactor walls, and a plurality of connected lumens that includes a resorbable polyester, wherein the plurality of connected lumens are formed by the connected adjacent walls of the plurality of reactor walls, wherein the at least two fittings are configured so that upon release of the at least two fittings, a connection between the plurality of connected lumens is disconnected and a plurality of unconnected lumens is exposed lengthwise, and wherein a shortest distance of any point within a single lumen of the plurality of connected lumens to an adjacent reactor wall is less than 8 cm.

* * * * *